United States Patent [19]

Dhar

[11] Patent Number: 5,521,020
[45] Date of Patent: May 28, 1996

[54] METHOD FOR CATALYZING A GAS DIFFUSION ELECTRODE

[75] Inventor: Hari P. Dhar, College Station, Tex.

[73] Assignee: BCS Technology, Inc., Bryan, Tex.

[21] Appl. No.: 324,177

[22] Filed: Oct. 14, 1994

[51] Int. Cl.$^6$ ................................................ H01M 4/04
[52] U.S. Cl. .......................... 429/142; 427/115; 502/101
[58] Field of Search .............................. 502/101; 427/115; 429/42

[56] References Cited

U.S. PATENT DOCUMENTS

| | | | |
|---|---|---|---|
| 3,405,010 | 10/1968 | Kordesch et al. | 502/101 X |
| 3,779,812 | 12/1973 | Witherspoon et al. | |
| 3,979,227 | 9/1976 | Katz et al. | 427/115 |
| 4,141,801 | 2/1979 | Perry | |
| 4,248,682 | 2/1981 | Lindstrom et al. | 429/42 X |
| 4,541,905 | 9/1985 | Kuwana et al. | 204/38.7 |
| 4,610,938 | 9/1986 | Appleby | 429/42 |
| 4,661,411 | 4/1987 | Martin et al. | 428/421 |
| 4,876,115 | 10/1989 | Raistrick | 427/115 |
| 5,084,144 | 1/1992 | Reddy et al. | 205/104 |
| 5,085,743 | 2/1992 | Reddy et al. | 205/105 |
| 5,211,984 | 5/1993 | Wilson | 429/42 X |
| 5,242,764 | 9/1993 | Dhar | 429/30 |
| 5,318,863 | 6/1994 | Dhar | 429/30 |

OTHER PUBLICATIONS

Wilson, M. S. and Gottesfeld, S.; "High Performance Catalyzed Membranes of Ultra–low Pt Loadings for Polymer Electrolyte Fuel Cells"; J. Electrochem. Soc., vol. 139, No. 2, pp. L28–L30; Feb. 1992.

Primary Examiner—Stephen Kalafut
Attorney, Agent, or Firm—Stanford & Bennett

[57] ABSTRACT

A method for catalyzing a gas diffusion electrode (GDE) with a catalytic material mixed with a solubilized electrolyte, where the electrolyte preferably comprises a perfluorocarbon sulfonic acid copolymer. The catalytic material and solubilized electrolyte are mixed to form a paste or the slurry, which is then applied layer by layer onto the catalyzable side of the GDE while the electrode is kept on a hot plate at a temperature of approximately 80°–100° C. The electrode and the catalyst layers are then dried in an oven at a temperature of about 100° C. for about 10 minutes. The catalytic material preferably comprises a metal, such as platinum, and is further mixed with a supporting material comprising a high surface area carbon, resulting in a platinum-on-carbon mixture. A method according to the present invention avoids exposure of the high surface area catalytic material to the high temperatures of the conventional method, thereby keeping the maximum surface area of the catalyst available for the electrochemical reaction. Such gas diffusion electrodes are preferably used in operation of proton exchange membrane fuel cells without external humidification.

22 Claims, 4 Drawing Sheets

METHOD FOR CATALYZING A GAS DIFFUSION ELECTRODE

FIELD OF THE INVENTION

The present invention relates to gas diffusion electrodes, and more particularly to a method for catalyzation of a gas diffusion electrode and proton exchange membrane fuel cells utilizing such electrodes.

DESCRIPTION OF THE RELATED ART

A gas diffusion electrode (GDE) contains a hydrophobic polymer in contact with a high surface area electrically conductive or semiconductive material which supports the finely dispersed catalyst particles. The hydrophobic polymer is usually PTFE (polytetrafluoroethylene), the support material is usually carbon, and the catalyst is usually a metal, such as platinum. The polymer-catalyst-support layer is held by a carbon cloth or a carbon paper. Conventionally, the whole assembly is sintered at a temperature of approximately 350° Celsius (C) to make the electrode porous. The side of the electrode which contains the catalyst layer is referred to as the "catalytic" side and the opposite side is referred to as the "gas" or gas-permeable side. In this conventional method, platinum particles lose some of their surface area during the sintering process. Thus, the conventional electrode does not reach the highest possible performance because of the loss of surface area of the catalyst during preparation of the GDE.

A GDE is used in electrochemical processes for bringing gaseous reactants to the reaction sites in contact with an electrolyte. Such an electrochemical process is typically used in a fuel cell for generating electricity. A GDE can be used in an alkaline, phosphoric acid and proton exchange membrane (PEM) electrolyte fuel cell, also referred to as a solid polymer electrolyte fuel cell (SPFC). The former two electrolytes—alkaline and phosphoric acid—being liquid, can easily bathe the catalyst (or reaction sites) and make good contact with the catalyst for optimum fuel cell performance. A three dimensional reaction zone on an electrode in contact with the electrolyte is not created easily since the PEM electrolyte is a solid. The result is that the efficiency of utilization of the catalyst in a fuel cell reaction involving a PEM electrolyte is low, about 10–20%. Attempts have been made to address this problem by (a) impregnating a small amount of electrolyte solution into the electrode structure, drying the electrolyte and finally pressing the impregnated electrodes against the PEM electrolyte, (b) using a relatively greater proportion of platinum in the platinum/carbon mixture that constitutes the porous electrode, (c) sputtering a thin layer of platinum on top of the porous electrode and, in some limited cases, (d) depositing a layer of platinum on top of the already catalyzed electrode.

As an alternative to the above procedure for enhancing efficiency of catalyst utilization and fuel cell performance, U.S. Pat. Nos. 5,084,114 and 5,085,743 issued Jan. 28, 1992 and Feb. 4, 1992, respectively, to Reddy et al., describe a method of introducing the catalyst on an uncatalyzed porous GDE. In this procedure, a deposition of a PEM electrolyte on an uncatalyzed electrode is first made and then the catalytic metal is introduced into the electrode by an electrochemical process of deposition. Such electrochemical method of deposition is a relatively slow process and requires a counter electrode, an additional electrolyte and equipment for the deposition to take place. Wilson and Gottesfeld, High Performance Catalyzed Membranes of Ultra-low Pt Loadings for Polymer Electrolyte Fuel Cells, 139 J. Electrochem. Soc. No. 2 (1992), describe another approach involving a method of directly depositing a layer of catalyst onto the PEM electrolyte.

Normally, a PEM fuel cell is operated with humidification where water is supplied externally into the fuel cell. This water for humidification is either supplied from outside or produced in the fuel cell and reused for humidification. The humidification unit can be placed outside or inside the fuel cell. In either case, the process of humidification requires an auxiliary subsystem which adds to the fuel cell weight in addition to the inconvenience it creates for operating a fuel cell at a high temperature and pressure. U.S. Pat. Nos. 5,242,764 and 5,318,863, issued Sep. 7, 1993 and Jun. 7, 1994, respectively, to the inventor of the present application describe operation of a PEM fuel cell without external humidification. The fuel cell is internally humidified without requiring a humidification unit. The fuel cell operates at conditions starting at the near ambient temperature and pressure. Under milder operating conditions, the kinetic advantage of fuel cell reaction is partially decreased. Thus, the necessity for operation of a fuel cell at ambient and near ambient conditions has exerted requirements for improved performance from a GDE. Moreover, for fuel cell operation without external humidification, it is also necessary that the electrode structure aid the retention of water in the PEM electrolyte for migration of protons to occur from the anode to the cathode. Under the usual high temperature and pressure of a PEM fuel cell, a GDE should preferably resist temporary dryness of the PEM electrolyte lessening the requirement of external humidification.

Thus, it is desired to find a simple and fast method of catalyzing the electrodes of a fuel cell to achieve superior results. It is also desired to operate the fuel cell at near ambient temperature and pressure without requiring a humidification unit.

SUMMARY OF INVENTION

According to the present invention, solubilized electrolyte is added to a catalyst material and then mixed together until a fine paste is formed. One or more layers of the paste is applied to the catalyzable side of an electrode. The electrode is preferably maintained at a temperature of about 80°–100° C. during the application of the layers. After each layer is applied, it is dried in an oven at a temperature of approximately 100° C. for about 5 minutes. The deposited layers are then dried in an oven at a temperature of approximately 100° C. for about 10 minutes.

The electrode is preferably formed by depositing a high surface area carbon and a hydrophobic polymer on a substrate and sintering the components at a temperature of 300°–350° C. for about 30 minutes. The substrate preferably comprises carbon cloth or carbon paper.

The catalytic material preferably comprises a very fine powder of a catalytic metal such as platinum. Furthermore, the catalyst is preferably mixed with a supporting material comprising a high surface area carbon, resulting in a platinum-on-carbon catalyst mixture. The solubilized electrolyte is preferably made from a perfluorocarbon sulfonic acid copolymer, a PEM electrolyte used in fuel cell assembly.

In one embodiment according to the present invention, a high surface area platinum catalyst along with high surface area carbon is mixed with a solution of a perfluorocarbon sulfonic acid copolymer and is applied onto the catalytic side of a gas diffusion electrode (GDE). The electrode is then dried at approximately 100° C.

In another embodiment of the present invention, a partially catalyzed GDE is further catalyzed by high surface area platinum along with a high surface area carbon mixed with a solution of perfluorocarbon sulfonic acid copolymer.

In another embodiment of the present invention, an uncatalyzed or partially catalyzed GDE is catalyzed by high surface area platinum in presence of very little or no carbon mixed with a solution of a perfluorocarbon sulfonic acid copolymer.

A GDE fuel cell according to the present invention exhibits superior performance to that of present state-of-the-art electrodes in internally humidified PEM fuel cells. One advantage of GDE fuel cells according to the present invention is that the catalyst particles are not exposed to the considerably higher temperatures, typically about 350° C. This preserves the maximum surface area of the catalyst for an electrochemical reaction, which enables a high efficiency of catalyst utilization in a fuel cell reaction. The present invention is also simpler to practice than that taught in prior art, where a copolymer is typically deposited and then a catalyst is introduced by an electrochemical method. In contrast, the present invention teaches a physical method for introduction of the catalyst into the structure of the uncatalyzed electrode.

BRIEF DESCRIPTION OF DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS(S)

Figure 1A:
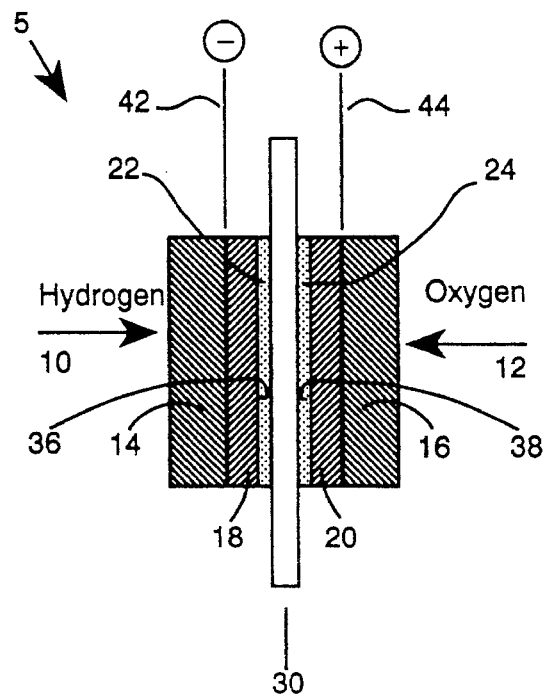
FIGS. 1($a$) and 1($b$) illustrate alternative embodiments of fuel cells having electrodes catalyzed according to the present invention.
Figure 1B:
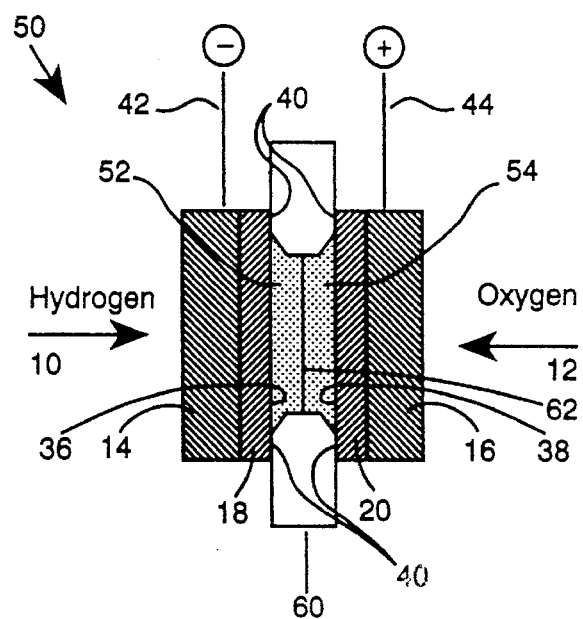

FIGS. 1($a$) and 1($b$) illustrate alternative embodiments of fuel cells 5, 50 including electrodes 18, 20 catalyzed according to the present invention. Fuel cells 5, 50 are similar to that disclosed in U.S. Pat. No. 5,318,863 issued Jun. 7, 1994, which is hereby incorporated by reference, except that the present invention concerns an improvement thereof. It is understood that electrodes according to the present invention can be utilized in any suitable type of fuel cells and are not limited to those illustrated herein.

Referring now to FIG. 1($a$), there is shown in schematic cross-section a fuel cell 5 according to the present invention. The fuel cell 5 includes gaseous reactants which include a fuel source 10 and an oxidizer source 12. The gases 10 and 12 diffuse through anode backing layer 14 and cathode backing layer 16, respectively, to porous electrodes forming an oxidizing electrode or anode 18 and a reducing electrode or cathode 20, which are otherwise referred to as the electrodes 18 and 20. The electrodes 18 and 20 have deposits of solid electrolyte 22 and 24, respectively. These electrolyte deposits 22 and 24, together with an oversized membrane 30 positioned therebetween, separate the anode 18 and the cathode 20. The electrolyte deposits 22 and. 24 are made of any perfluorocarbon sulfonic acid copolymer that could be used as electrolyte membrane in a proton exchange membrane fuel cell. The amount of deposit used is preferably 0.2 to 1.2 milligrams per square centimeter (mg·cm$^{-2}$) of electrode area, and is placed evenly along the entire surfaces of the respective electrodes 18 and 20.

The membrane 30 preferably has a low gram equivalent weight of about 1000 grams or less and preferably has a thickness of about 125 micrometers ($\mu$m) or less. More particularly, the membrane 30 has a gram equivalent weight of about 800–1000 grams and a thickness of about 125 $\mu$m. Alternatively, the membrane 30 may have a higher gram equivalent weight of about 1100 grams, but should be thinner, preferably having thickness of 50–125 $\mu$m. A thicker membrane, such as NAFION® 117 of thickness 175 $\mu$m can also be used, but it's performance will be less than that of the thinner membrane. A membrane having a lower equivalent weight has a higher density of protons in its molecular structure, and thus more easily transfers protons at a reduced internal resistance. These conditions allow the fuel cell assembly 5 to operate at near ambient conditions without requiring humidification of the solid electrolyte. Anode connection 42 and cathode connection 44 are used to interconnect with an external circuit (not shown) or with other fuel cell assemblies. Thin catalyst layers 36 and 38 are placed on the catalyst side of the electrodes 18, 20, respectively, according to the process of the present invention, further described below. The thickness of the catalyst layers 36, 38 are enhanced in the drawings for purposes of clarity, although it is understood that the layers 36, 38 are typically significantly thinner at the scale shown.

A membrane/electrodes assembly is prepared by putting the components shown in FIG. 1($a$) together and pressing for about 90 seconds at a pressure of about 1,000 psig and at a temperature of about 130° C. The above temperature and pressure conditions ensure that the two electrodes 18 and 20 and the electrolyte deposits 22 and 24 are in good contact with each other and with the membrane 30 when preparing the membrane/electrodes assembly.

Suitable fuel sources 10 that are consumed by assemblies made in accordance with the invention in order to produce electrical energy are hydrogen-containing materials, such as water, methane, and methanol, for example. According to some embodiments, the fuels are supplied to the assembly in liquid form, while according to alternative embodiments, fuels are supplied in gaseous form. According to still further embodiments, hydrogen is obtained from reversible metal hydride formers, such as, for example, LaNi$_5$, FeTi and MmNi$_{4.15}$Fe$_{0.85}$, where Mm is a mischmetal, among others.

Many suitable oxidizer sources 12 or oxidizer species are available for combining with the fuel to provide a mixture suitable for powering the fuel cells described herein. In practice, the most common oxidizer is gaseous oxygen or air.

Referring now to FIG. 1($b$), a schematic cross-section of the fuel cell 50 is shown implemented according to the present invention. Similar components as those of the fuel cell 5 assume identical reference numerals. In particular, the fuel cell 50 also includes a fuel source 10 and an oxidizer source 12 which diffuse through an anode backing layer 14 and a cathode backing layer 16, respectively, to porous electrodes forming an anode 18 and a cathode 20. Thin catalyst layers 36 and 38 are applied on the exposed surfaces of the electrodes 18 and 20, respectively, according to the present invention. Again, these layers 36, 38 are enhanced in the drawings. The electrolyte deposits 52 and 54, together with an oversized non-conducting gasket 60 positioned therebetween with a hole 62 separate the anode 18 and the cathode 20.

The electrolyte deposits 52 and 54 comprise similar materials and are applied in a similar manner as described for the fuel cell assembly 5, except that no electrolyte material is deposited at the respective peripheries 40 of the electrodes 18 and 20. Also, the amount of the electrolyte deposits 52 and 54 is preferably about 5 mg·cm$^{-2}$ for each electrode, having a thickness roughly uniform near the central portions 56 of the electrodes 18 and 20, but which gradually decrease at an outer location 58 between the central portion 56 and the periphery 40 of each of the electrodes 18 and 20. The exposed peripheries 40 of the electrodes 18 and 20, which are lined with the catalyst layers 36 and 38, preferably combine with the gasket 60 through hydrophobic-hydrophobic interaction when the fuel cell 50 is assembled. However, the present invention is not limited to any particular type of interaction with the gasket 60 and the electrodes 18 and 20 along the peripheries 40.

Figure 2:
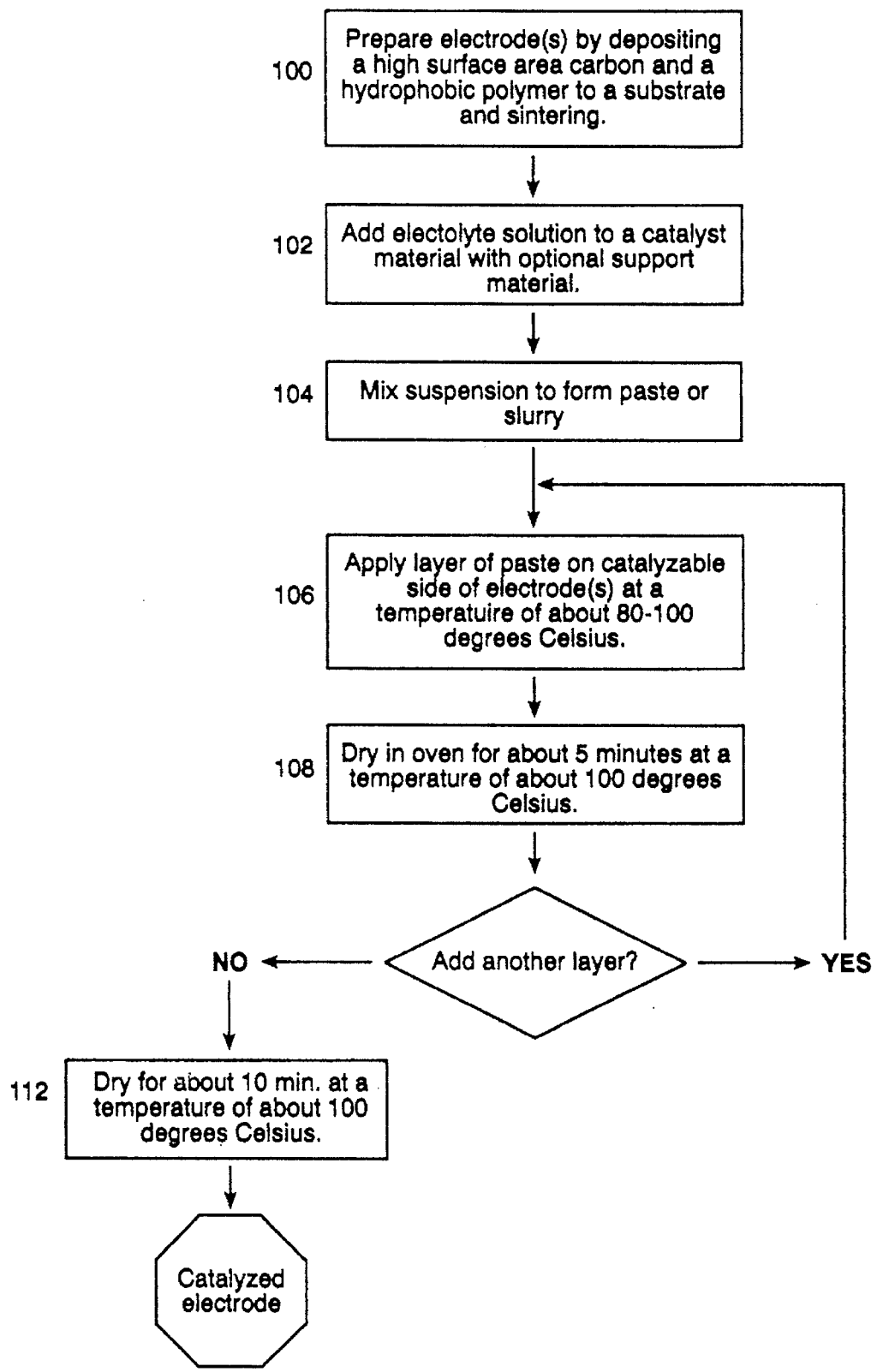
FIG. 2 is a flowchart diagram illustrating a catalyzation process according to the present invention of an uncatalyzed or a partially catalyzed electrode.

Referring now to FIG. 2, a flowchart diagram is shown illustrating a catalyzation process according to the present invention for applying the catalyst layers 36, 38 to the catalyzable side of the electrodes 18, 20, respectively. In step 100, an electrode is formed by depositing a high surface area carbon and a hydrophobic polymer on a substrate and sintering the components at a temperature of about 300°–350° C. for about 30 minutes. The substrate preferably comprises carbon cloth or carbon paper. In step 102, a solubilized electrolyte is added to a catalyst material. The suspension of catalyst in electrolyte is then mixed together in step 104 until a fine paste is formed. The paste is applied to the catalyzable side of the GDE electrode 18, 20 in step 106, while the electrode is preferably kept over a hot plate at a temperature of about 80°–100° C. to prevent transfer of the catalyst along with the copolymer electrolyte beyond the catalytic side of the GDE electrode. After each layer is applied, the layer is preferably dried in an oven for about 5 minutes at a temperature of about 100° C. in step 108. If another layer is to be applied, another layer is added as described in step 106. After all layers are applied, the deposited layers are dried at a temperature of about 100° C. for about 10 minutes in an oven in step 112.

The hydrophobic polymer used for preparing the electrodes 18, 20 is preferably a fluorinated ethylene polymer or PTFE (polytetrafluoroethylene) also known under the trademark TEFLON®. Alternative hydrophobic polymers are unsaturated halogenated monomers with at least some of the halogens being fluorine. Ethylene is an example of an unsaturated compound and fluorine, chlorine, and bromine are examples of halogens. Other useful hydrophobic polymers include polyvinylidene fluoride, polyhexafluoropropene, polytrifluorochloroethylene, including copolymers of the various halogenated unsaturated monomers, and various mixtures of the hydrophobic polymers. The product thus formed is referred to as an uncatalyzed electrode since it does not have an added noble metal catalyst. A partially catalyzed electrode is also acceptable with the addition of a noble metal catalyst, such as platinum (Pt), gold (Au), palladium (Pd), iridium (Ir), silver(Ag) etc. One side of the resulting electrode is a gas-permeable side, which contains high surface area carbon mixed with a greater amount of hydrophobic polymer than used on the catalyzable side. The gas-permeable side of some GDEs may not contain any distinct layer of carbon and PTFE. The carbon cloth or carbon paper may have only received treatment with PTFE to enable it to become gas-permeable.

The catalytic material preferably comprises a very fine powder of a catalytic metal such as platinum (Pt). Platinum is the best known catalyst for the primary reactions occurring in a fuel cell, including hydrogen oxidation and oxidation reduction. Other suitable metals include iridium, palladium, gold, nickel, silver etc. These metals can be combined with other metals forming various alloys of these metals, such as alloys of platinum with other noble and non-noble metals. Examples of alloying non-noble metals are cobalt (Co), chromium (Cr), nickel (Ni), etc., and examples of alloying noble metals are gold, palladium, iridium, ruthenium etc. Other suitable catalytic materials include non-metals, such as electrically conductive mixed oxides with a spinel or perovskite structure. In a more specific embodiment, the catalyst for the hydrogen electrode 18 comprises either platinum or its alloys, and the catalyst for the oxygen electrode 20 comprises either platinum or another oxygen reducing catalyst, such as a macrocyclic chelate compound. Macrocyclic chelates are large organic molecules chelated, or otherwise bonded to metals, such as cobalt or chromium. These chelates are organo-metallic catalysts.

Preferably, the catalytic material is supported by a support or carrier material comprising a high surface area carbon. Alternative materials are high surface area alumina ($Al_2O_3$), titanium dioxide ($TiO_2$), and silica ($SiO_2$), although the conductivity of these materials is not as high as that of carbon, the preferred material. The support material may alternatively be any high surface area electrically conductive compound or semiconductive inorganic compounds. In the preferred embodiment, the catalytic material comprises a platinum-on-carbon catalyst mixture where high surface area platinum is supported on a high surface area carbon (where platinum is an inorganic material and carbon is an organic material).

The solubilized electrolyte added to the catalyst material preferably comprises a perfluorocarbon sulfonic acid copolymer, also known as a proton exchange membrane (PEM) electrolyte, which is preferably made in a mixture of water and alcohols. In general, the solubilized electrolyte comprises a copolymeric perfluorocarbon material containing a basic unit of fluorinated carbon chain with a perfluoro side chain containing a sulfonic acid group. In some copolymeric materials, the sulfonic acid group could be replaced by a carboxylic acid group. There may be variations in the molecular configuration of the copolymer leading to variation of its equivalent weight.

In one embodiment according to the present invention, a solubilized electrolyte made from perfluorinated sulfonic acid copolymer known under the trademark NAFION® available from E. I. DuPont de Nemours was used. The solution was purchased as a 5% solution of NAFION® 105. Nonetheless, any perfluorocarbon copolymer suitable for use as an electrolyte membrane in a PEM fuel cell, such as those made by Dow Chemical Company, is equally suitable. The copolymers have different equivalent weights, preferably within the range of 800–1100 grams. The gram equivalent weight of a substance is defined as the weight in units of gram which will react with one gram of hydrogen. NAFION® 117 has the equivalent weight of about 1100, NAFION® 105, about 1000 grams and a Dow membrane, about 800 grams. A low equivalent weight membrane has inherently more protons per unit weight in its structure and thus functions better as a medium for proton transfer in a fuel cell reaction.

The perfluorinated sulfonic acid copolymer becomes soluble in lower aliphatic alcohols, such as ethanol and isopropanol, for example, containing about 10% water in a closed container heated in a temperature range of about 200°–300° C. for a period of about two to five hours. The solution, when dried, has different characteristics than the original material. The water absorption characteristics of the dried material is higher than the original copolymer.

Alternatively, any solid electrolyte that conducts protons in the solid state and which is soluble is suitable to form the electrolyte, such as certain hydrated alumina ($Al_2O_3$) or ceramic material ($CeO_2$).

The following two examples further illustrate the procedure for making electrodes according to the present invention:

EXAMPLE 1

24 mg of platinum-on-carbon mixture containing 60% platinum was weighed in a 10 ml beaker. 0.3 ml of a 5% solution of NAFION® 105 was added to it. A fine paste was made through mixing for about 2 minutes with a Plexiglas rod, taking care that the rod itself is not ground in the mixing process. It was discovered that a glass rod can contaminate the solution by releasing fine glass particles during mixing. A portion of the paste was applied with a brush onto a 6.5 $cm^2$ piece of uncatalyzed electrode through several applications. During each application, the electrode was kept over a hot plate at a temperature of about 100° C. to ensure that the paste did not penetrate beyond the uncatalyzed layer to the "gas" side of the electrode. After each application the electrode was dried in an oven for about 5 minutes at a temperature of about 80°–100° C. After the final application of the paste, the electrode was dried for about 10 minutes at a temperature of about 100° C. The total amount of deposit was about 9 mg in the dry state. For calculation of platinum content of the electrode, it is only necessary to know the weight of 0.3 ml solution of NAFION® 105, which was determined prior to the electrode preparation to be about 15 mg. The 24 mg of platinum-on-carbon (Pt/C) mixture contained about 14.4 mg of platinum. Thus the total amount of 39 mg solid, comprising 24 mg Pt/C mixture and 15 mg NAFION® 105 in the dry state, contained 14.4 mg of platinum. On that basis, 9 mg of deposit contained about 3.3 mg platinum over 6.5 $cm^2$ area. This amount of platinum corresponds to about 0.51 ($mg \cdot cm^{-2}$.

EXAMPLE 2

40 mg of high surface platinum and 35 mg of Pt/C containing 60% platinum was weighed in a 10 ml beaker containing 0.4 ml of NAFION® 105 solution. A fine paste was made by mixing for about 2 minutes with a Plexiglas rod. A portion of the paste was applied with a brush onto a 5 $cm^2$ piece of uncatalyzed electrode through several applications. During each application the electrode was kept over a hot plate at a temperature of about 80°–100° C. to ensure that the paste did not penetrate beyond the uncatalyzed layer to the "gas" side of the electrode. After each application the electrode was dried in an oven for about 5 minutes at a temperature of about 100° C. After the final application of the paste, the electrode was dried for about 10 minutes at a temperature of about 100° C. The total amount of deposit was about 41 mg in the dry state. This amount of deposit was equivalent to platinum deposit of about 5.2 $mg \cdot cm^{-2}$.

Figure 3:
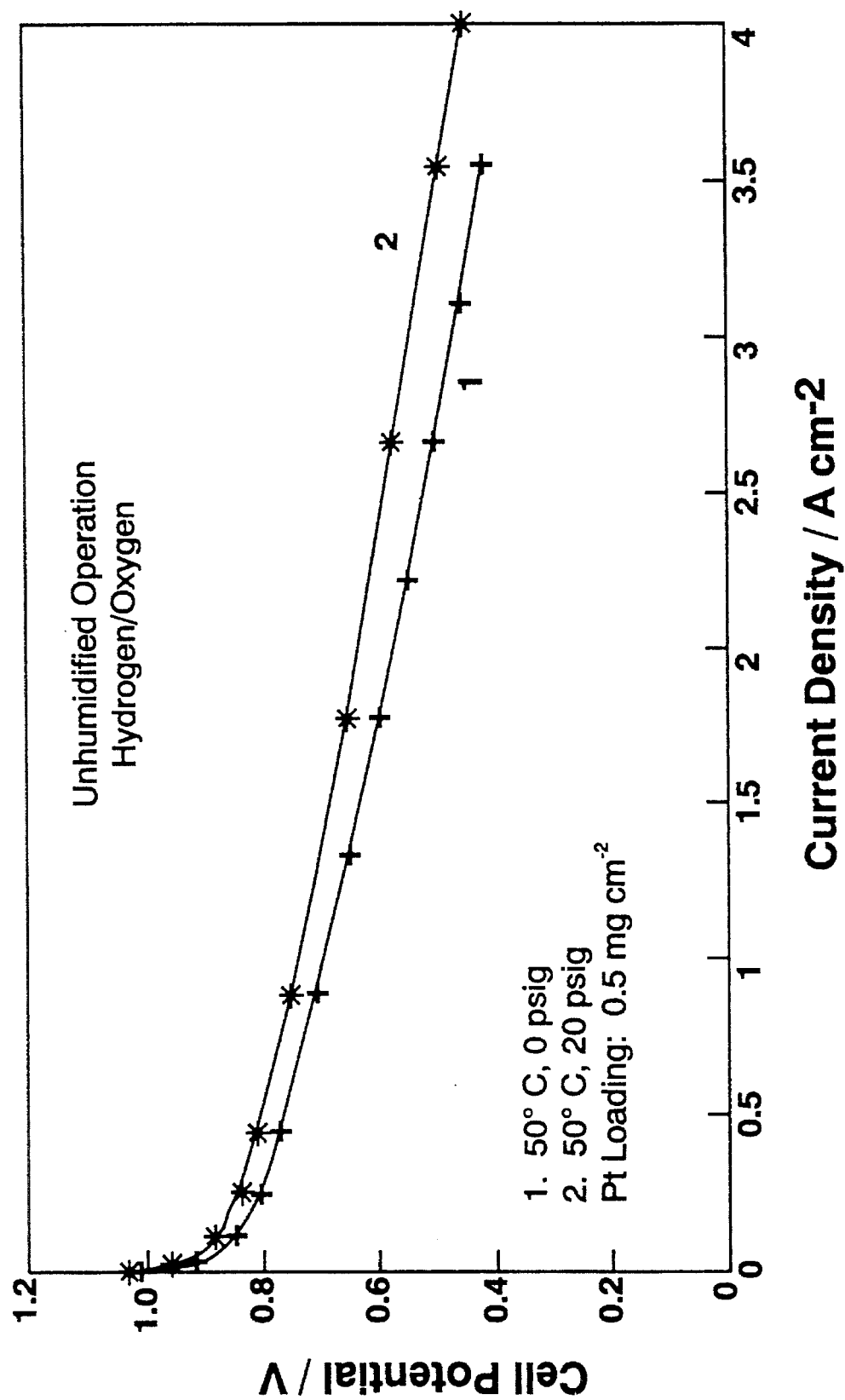
FIG. 3 is a graph of cell potential versus current density comparing the performance of a fuel cell according to the present invention at various pressures.

FIG. 3 is a graph of cell potential in volts (V) versus current density in Amperes (A) per $cm^{-2}$ of a PEM fuel cell utilizing electrodes prepared according to Example 1, described above. The platinum loading of electrodes was about 0.5 $mg \cdot cm^{-2}$. Two pieces of 5 $cm^2$ area electrodes were used for this fuel cell. About 15 mg NAFION® 105 was deposited around the central part covering an area of about 3 $cm^2$ on each electrode in the dry state. These two electrodes were combined with a 70 μm polypropylene film having a central cutout part of area 2.25 $cm^2$ to form the membrane electrode composite. This composite was then assembled to make the PEM fuel cell that operated with $H_2/O_2$ reactants. The active area of the fuel cell was 2.25 $cm^2$, equal to the area of the cutout part of the polypropylene film. The fuel cell was operated without external humidification. The fuel cell performance was obtained at pressures 0 and 20 psig at the temperature of 50° C. At 0.6 V, the power outputs were about 1 Watt (W) and 1.4 W·cm-2 at 0 and 20 psig, respectively.

Figure 4:
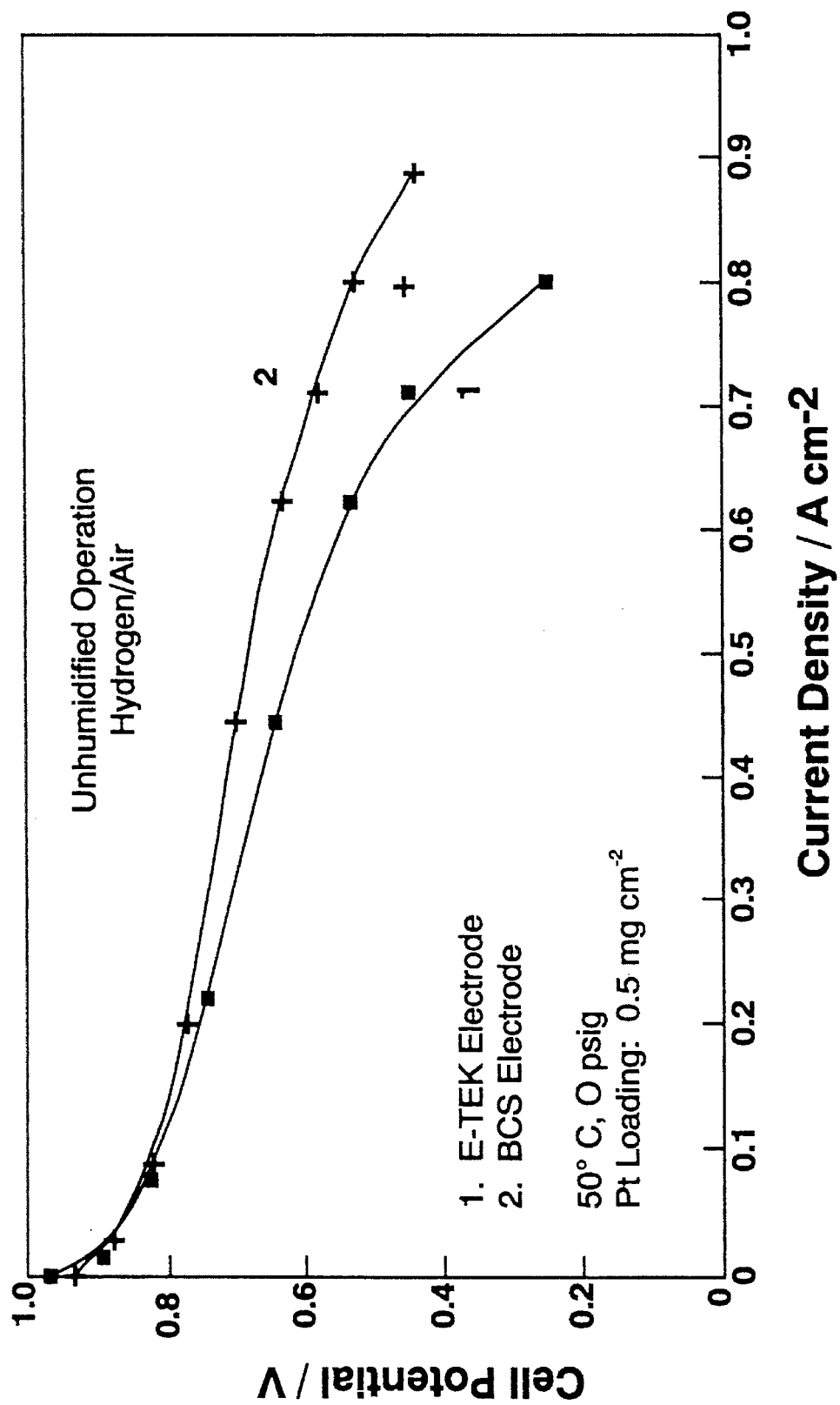
FIG. 4 is a graph of cell potential versus current density comparing the performance of a fuel cell according to the present invention with a fuel cell, built with commercial electrodes.

FIG. 4 is a graph of cell potential versus current density comparing the performance of a fuel cell according to the present invention with a fuel cell built with commercial electrodes using reactants $H_2$/air. Curve 1 was obtained with electrodes prepared according to the method of the present invention, and curve 2 with electrodes purchased from E-TEK of Natick, Mass. The platinum loadings of electrodes were 1 $mg \cdot cm^{-2}$, and electrode areas, 5 $cm^2$. About 15 mg of NAFION® 105 was deposited around the central part covering an area of about 3 $cm^2$ on each electrode in the dry state. The membrane-electrode composite for each pair of electrodes had polypropylene film having a central cutout part of area 2.25 $cm^2$, similar to that of FIG. 3. Each membrane-electrode composite was assembled to make one fuel cell. The fuel cell performance with $H_2$/Air is shown at 50° C. and 0 psig pressure. The power output at 0.6 V with the commercial electrode was about 0.32 $W \cdot cm^{-2}$ and that with the electrode according to the present invention was about 0.52 $W \cdot cm^{-2}$. These data indicate an improvement of about 60% over the commercial electrode.

It can now be seen that a fuel cell according to the present invention provides advantages and improvements over fuel cells of prior art. A GDE fuel cell prepared according to the present invention performs superior to present state-of-the-art electrodes in PEM fuel cells without external humidification. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for catalyzing a gas diffusion electrode, comprising the steps of:

combining a solubilized solid electrolyte with a catalytic material forming a paste;

applying at least one layer of the paste to the catalyzable side of the gas diffusion electrode while simultaneously applying heat in the temperature range of 80°–100° C.; and drying the gas diffusion electrode.

2. The method of claim 1, wherein the gas diffusion electrode is formed by depositing a high surface area carbon and a hydrophobic polymer to a substrate and sintering the substrate at a temperature of about 300°–350° C.

3. The method of claim 2, wherein said substrate comprises carbon cloth or paper.

4. The method of claim 2, wherein said hydrophobic polymer comprises polytetrafluoroethylene (PTFE).

5. The method of claim 1, wherein said applying step further comprises the steps of:

applying a plurality of layers of the paste; and after each layer is applied, drying the gas diffusion electrode in an oven.

6. The method of claim 5, further comprising the step of drying the gas diffusion electrode at a temperature of about 100° C. for about 5 minutes after each layer is applied during said applying step.

7. The method of claim 1, wherein during said drying step, the gas diffusion electrode is heated for about 10 minutes at a temperature of about 100° C.

8. The method of claim 1, wherein the catalytic material comprises a metal.

9. The method of claim 8, wherein the catalytic material comprises platinum.

10. The method of claim 8, wherein the catalytic material is selected from the group consisting of platinum, iridium, palladium, gold, silver and nickel.

11. The method of claim 10, wherein the catalytic material is alloyed with either noble or non-noble metals.

12. The method of claim 1, wherein the catalytic material comprises a non-metallic, electrically conductive mixed oxide with a spinel or perovskite structure.

13. The method of claim 1, wherein the catalytic material comprises a macrocyclic chelate compound.

14. The method of claim 1, wherein the catalyst material is supported by a high surface area compound.

15. The method of claim 14, wherein the compound is electrically conductive.

16. The method of claim 14, wherein the compound is a semiconductive inorganic compound.

17. The method of claim 14, wherein the compound is a high surface area carbon.

18. The method of claim 1, wherein the solubilized solid electrolyte comprises a copolymer having a basic unit including a perfluorocarbon chain with a perfluoro side chain containing a sulfonic acid group, or a carboxylic acid group attached thereto.

19. The method of claim 18, wherein said solubilized solid electrolyte has an equivalent weight between 800 and 1100 grams.

20. The method of claim 1, wherein the solubilized solid electrolyte comprises a perfluorocarbon sulfonic acid copolymer.

21. An electrochemical cell, comprising:

a first porous gas diffusion hydrogen electrode;

a second porous gas diffusion oxygen electrode, said second electrode defining an electric field with said first electrode; and an electrolyte membrane positioned between and in contact with said first and second electrodes;

wherein said first and second electrodes are catalyzed by combining a solubilized solid electrolyte with a catalytic material forming a paste, applying at least one layer of said paste to the catalyzable side of the electrode while simultaneously applying heat in the temperature range of 80°–100° C., and drying the electrode, and wherein said first electrode is catalyzed using platinum and said second electrode is catalyzed using a macrocyclic chelate compound as the catalytic material.

22. A fuel cell for generating electricity from a reaction between a fuel source and an oxidant source, the fuel cell comprising:

a first porous gas diffusion electrode;

a second porous gas diffusion electrode, said second electrode defining an electric field with said first electrode; and an electrolyte membrane comprising a perfluorocarbon sulfonic acid copolymer positioned between and in contact with said first and second electrodes;

wherein said first and second electrodes are catalyzed by combining a solubilized solid electrolyte with a catalytic material forming a paste, applying at least one layer of said paste to the catalyzable side of the electrode while simultaneously applying heat in the temperature range of 80°–100° C., and drying the electrode, and wherein said first electrode is catalyzed using platinum and said second electrode is catalyzed using a macrocyclic chelate compound as the catalytic material.

* * * * *